Figure 1:
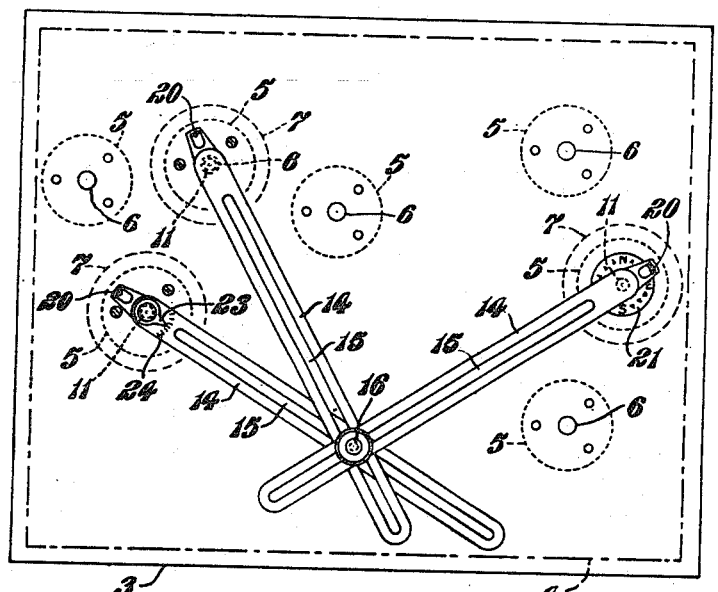

March 5, 1946.  P. ADORJAN ET AL  2,396,141
RADIO DIRECTION FINDING AND INDICATING APPARATUS
Filed Sept. 5, 1941

Inventors:
Paul Adorjan,
Ralph Parton Gabriel,
by Pierce + Scheffler,
Attorneys.

Patented Mar. 5, 1946

2,396,141

UNITED STATES PATENT OFFICE 2,396,141

RADIO DIRECTION FINDING AND INDICATING APPARATUS

Paul Adorjan, Kingston Hill, and Ralph Parton Gabriel, Chobham, England, assignors to Rediffusion Limited, London, England, a British company Application September 5, 1941, Serial No. 409,738
In Great Britain July 11, 1940

12 Claims. (Cl. 35—11)

This invention relates to the art of radio direction finding and indicating and is particularly concerned with the provision of apparatus whereby pupils can be instructed and trained in the art of radio navigation.

There has been described in the specification of co-pending patent application Serial No. 410,056, filed Sept. 8, 1941, by Paul Adorjan, an apparatus for simulating practical conditions pertaining to direction finding by radio which enables pupils to be instructed in the art without the necessity of employing large scale radio transmitting stations or aircraft. In general this apparatus includes means for distributing electric signals to a signal receiving equipment adapted to be operated by a pupil and means are provided whereby such signals can be modified in a manner analogous to the phenomenon of variable amplitude or phase relationship which is characteristic of the reception of radio signals during relative orientation of the radio direction finding receiver means and a radio transmitter. In some cases the apparatus has included two or more signal generating means and associated distributing means and the pupil's equipment is such as to enable him selectively to receive such signals.

Now the present invention has for its object to provide means whereby still closer approximation to actual working conditions is obtainable when a plurality of "transmitter units" is employed, the term "transmitter unit" herein being used to define the signal generating and/or signal distributing means located at a position representing the point from which the imaginary radio signals are supposed to emanate, for example the position of an imaginary ground station.

Thus according to one feature of the invention the apparatus comprises a plurality of transmitter units, each of which is capable of distributing electric signals of a distinctive character, rotary control means whereby said electric signals can be made to exhibit variations in a manner analogous to the phenomenon of variable amplitude or phase relationship which is characteristic of the reception of radio signals during relative orientation of a radio direction finding receiver means and a radio transmitter, and means whereby the adjustment of said rotary control means with respect to a common point can be determined.

According to another feature of the invention the apparatus comprises a plurality of transmitter units, each of which is capable of distributing electric signals of a distinctive character, rotary control means whereby said electric signals can be made to exhibit variations in a manner analogous to the phenomenon of variable amplitude or phase relationship which is characteristic of the reception of radio signals during relative orientation of a radio direction finding receiver means and a radio transmitter, and means serving to interconnect said rotary control means in a manner enabling simultaneous variation of the signals to be effected.

Preferably the transmitter units are mounted in association with a map and represent the positions of imaginary ground stations and the arrangement enables the rotary control means of a plurality of differently located but similarly orientated transmitter units very readily to be set with respect to a common point which, for example, may represent the point occupied during an imaginary flight by a pupil who, by selective reception of the different signals, is able to take bearings on the several transmissions and from the information thus obtained plot or otherwise determine his apparent position.

Each of the said rotary control means may include a pointer which may be trained on the desired common point and in some cases to facilitate such an operation the pointers may have such length that they intersect.

Alternatively the control means are interconnected in a manner enabling simultaneous variation of the signals to be effected, for example, and preferably, each rotary control means is provided with a slotted arm and the several overlapping arms are interconnected with a pin which passes through them at the point of intersection.

Figure 2:
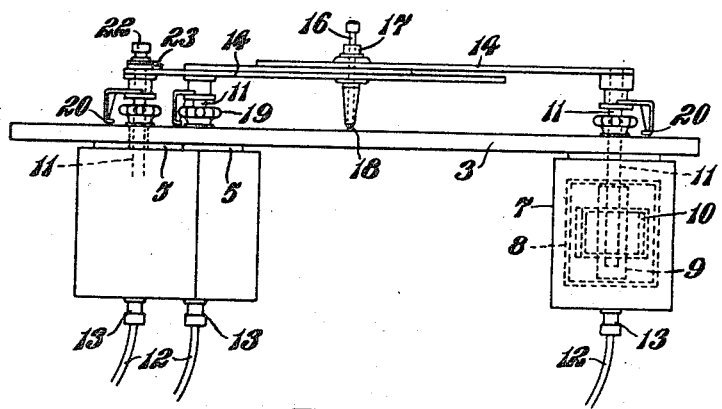

In order that the invention more readily can be understood it will now be described with reference to the accompanying drawing, wherein Figure 1 is a plan view and Figure 2 is a front elevation of a preferred embodiment.

In this particular arrangement the apparatus is associated with a map table 3 adapted to support on its top surface a map the outline of which is indicated at 4. This table is provided on its underside with seven differently positioned fixed plates 5, each of which is apertured and the aperture located in alignment with an aperture in the table, the passage-ways thus formed by the combined apertures being designated 6. To any one of these fixed plates, which are in fact location plates, there can be removably attached, for example by screw or other means, a metallic casing forming part of a transmitter unit. In the drawing three such casings 7 are shown, each attached to one of the plates 5 and housing a coil system which resembles a radio goniometer in that it comprises a pair of relatively fixed crossed coils, such as indicated at 8 and 9 respectively, and a symmetrically disposed rotatable coil 10, the latter being carried by a shaft 11 which extends upwardly through one of the passage-ways 6.

In the specification of the hereinbefore mentioned co-pending application there is described how such a coil system enables electric signals to be obtained from the crossed coils when a suitable signal current is fed to the rotatable coil and also how such signals can be made to exhibit amplitude variations when the said coil is rotated. With the present arrangement a suitable signal current, obtained for example from a separate valve oscillator means, is adapted to be fed to each coil assembly by leads of a flexible cable 12 which terminates in a plug and socket fitting 13 carried by the casing 7, the signals fed to the coil assemblies being of different frequency. Electric wave oscillations are induced in the crossed coils 8 and 10 for distribution to suitable signal receiving equipment arranged under the control of a pupil, for example receiving equipment of the nature described in the specification of said co-pending application, the separate signal components being transmitted from the transmitter unit 7 separate leads of the cable 12. Thus it will be understood that the amplitude of the induced waves obtainable from each pair of the crossed coils will depend upon the relative position of the associated rotatable coil and consequently by adjusting the latter coil, by rotating the shaft 11, the relative amplitude of the two signal components distributed from the crossed coils to the receiving equipment can be varied and made to resemble in effect the phase changing phenomenon which is characteristic of the reception of radio signals by a radio direction finding receiver during relative orientation of the receiver means and a radio transmitter.

Assuming the crossed coils of the three transmitter units are similarly orientated, a fact which can be assured during the attachment of the casings 7 to the plates 5, the axis of each unit is located at a point on the map representing the position of an imaginary ground station, and the rotatable coils of the units are "trained" on a common point representing the position of an imaginary craft, then the receiving apparatus may be operated by a pupil to tune in selectively to the respective frequencies of the transmitted signals and to respond to the respective pairs of signal components in faithful imitation of the operations to be carried out in actual working conditions for taking bearings from the selected position on ground stations located at the selected points, and enable the pupil to ascertain the position of the craft.

The determination of the amplitude relationship of the signal components being received by the receiving equipment and consequently the simulation phase relationship of said components, can be made by the adjustment of a search coil of a radio goniometer in the manner well known and as is set forth in the specification of the aforesaid co-pending application. In this way a pupil operator may take the bearing of a number of transmitter units as he will do in actual practice and if he is informed that the signals of a particular frequency correspond to certain known ground stations, he can then ascertain his apparent position.

To fulfil the object of the present invention the shafts 11 of the three transmitter units are mechanically interconnected so that simultaneous variation of the three signal transmissions can be effected. In the embodiment shown such interconnection is obtained by providing each shaft 11 with an arm 14, which is slotted longitudinally at 15, and coupling the overlapping arms by means of a pin 16 which passes through the slots at the point of intersection. A releasable locking nut 17 is provided for clamping the arms together in order that they can be set after adjustment. The lower end of the pin 16 or a part coaxial therewith, is pointed at 18 and this point is adapted to rest upon the surface of the map over which it can be moved when the lock nut 17 is released to permit relative movement of the arms. It will be understood that during such movement of the point 18 over the surface of the map the interconnected arms will cause simultaneous rotation of at least two of the shafts 11 so that the rotatable coils of the transmitter units are at all times "trained" upon the position occupied by the point 18.

Such simultaneous control enables an instructor who is in charge of the apparatus to operate the latter with much greater ease and speed than if he has to adjust the several transmitter units independently whilst moreover the resulting signal transmission are a nearer approximation to the actual radio transmission that they are intended to simulate.

The shafts 11 are also fitted with control knobs 19 and pointers 20, the latter co-operating with compass markings, for instance a detachable compass ring such as is indicated at 21 (Figure 1), whereby the setting of the rotatable coils and their bearing on a given point can be ascertained.

If the map is not corrected for Great Circle bearings, the connection between each of the shafts 11 and its associated arm 14 can be adjustable over a small angular extent so that compensation can be made for errors consequent upon the nature of the map projection or other reasons. In the apparatus shown one of the transmitter units is equipped with an example of such a compensating means, which comprises a releasable clamping nut 22, normally serving to clamp the arm 14 of the rotary control means to its associated shaft 11, but when released enables said arm to be moved angularly with respect to the shaft and, by subsequently using the nut to again clamp the arm to the shaft will maintain the angular adjustment which has been effected between the arm and the shaft. To facilitate making the setting a pointer 23 movable with the shaft is provided for co-operation with a scale indicated at 24.

It will of course be understood that when and if desired any one or more of the transmitter units can be removed from its location plate and transferred to another location plate so that simulation transmissions can be made from other points on the map. It will also of course be understood that, in some cases only two transmitter units may be employed whilst in still further cases more than three transmitter units may be used.

What we claim and desire to secure by Letters Patent is:

1. Apparatus for instructing students in the art of direction finding by radio, said apparatus including a plurality of simulation radio stations in spaced position on a carrier, each station comprising a transmitter unit for developing electric wave signals having with respect to each other characteristic differences corresponding to those developed at a direction-finding radio receiver by a radio signal arriving from a radio transmitter, a separate manually adjustable rotary control means for varying the characteristic differences between the developed signals to simulate change in characteristic difference with the relative orientation of a radio receiver with respect to a radio transmitter, and means associated with each rotary control means for determining the angular adjustment thereof with respect to a common point.

2. Apparatus as recited in claim 1, wherein each transmitter unit develops two signals of the same frequency and of relatively variable amplitude, and each rotary control means varies the relative amplitudes of the two signals developed by the associated transmitter unit.

3. Apparatus for instructing students in the art of direction finding by radio, said apparatus including a plurality of simulation radio stations in spaced position on a carrier, each station comprising a transmitter unit for developing electric wave signals having with respect to each other characteristic differences corresponding to those developed at a direction-finding radio receiver by a radio signal arriving from a radio transmitter, a separate manually adjustable rotary control means for varying the characteristic differences between the developed signals to simulate change in characteristic difference with the relative orientation of a radio receiver with respect to a radio transmitter, and means coupling said rotary control means for correlated adjustment to vary the characteristic differences between the signals from the several transmitter units to duplicate the differences observable at a common point on said carrier representative of the location of a radio direction-finding receiver with respect to the spaced radio transmitter stations.

4. Apparatus as recited in claim 3, wherein each transmitter unit develops two signals of the same frequency and of relatively variable amplitude, and each rotary control means varies the relative amplitudes of the two signals developed by the associated transmitter unit.

5. Apparatus for instructing students in the art of direction finding by radio, said apparatus including a plurality of simulation radio transmitting stations each of which comprises a transmitter unit by which electric wave signals with characteristic differences are developed, a rotary control means including a slotted arm for each such transmitter unit for adjusting the characteristic difference of said signals to exhibit variations analogous to the phenomenon of variable signal amplitude observed during relative orientation of a radio direction finding receiver means and a radio transmitter, and means extending through the slots of said arms to interconnect the arms for simultaneous movement.

6. Apparatus for instructing students in the art of direction finding by radio, said apparatus including a plurality of simulation radio transmitting stations each of which comprises a transmitter unit by which electric wave signals can be distributed, a rotary control means including a slotted arm for each transmitter unit for adjusting a characteristic of said signals to exhibit variations analogous to the phenomenon of variable signal amplitude observed during relative orientation of a radio direction finding receiver means and a radio transmitter, and releasable coupling means extending through the slots of and interconnecting said slotted arms at the point of their intersection so that simultaneous movement of all the slotted arms can be obtained.

7. Apparatus for instructing students in the art of direction finding by radio, said apparatus comprising a carrier, a plurality of electric wave signal distributing devices removably attached to said carrier, manually operable control means for each signal distributing device for altering a characteristic of the signals distributed thereby to exhibit variations analogous to the phenomenon of variable signal amplitude observed during relative orientation of a radio direction finding receiver means and a radio transmitter, and means interconnecting said rotary control means for simultaneous variation of the characteristics of all the signals.

8. Apparatus for instructing students in the art of direction finding by radio, said apparatus comprising a carrier, fixed means on said carrier at a plurality of differently positioned points each of which corresponds with the position of a simulation radio transmitting station, electric wave signal distributing means for removable attachment to any of said fixed means, manually operable control means for each signal distributing means whereby a characteristic of the signals distributed thereby can be made to exhibit variations analogous to the phenomenon of variable signal amplitude observed during relative orientation of a radio direction finding receiver means and a radio transmitter, and means interconnecting said rotary control means for simultaneous variation of the characteristics of all the signals.

9. Apparatus for instructing students in the art of direction finding by radio, said apparatus comprising a carrier for supporting a map on its upper surface, a plurality of electric wave signal distributing devices removably attached to the lower surface of said carrier, a rotary control means for each signal distributing device for adjusting a characteristic of the signals distributed thereby to exhibit variations analogous to the phenomenon of variable signal amplitude observed during relative orientation of a radio direction finding receiver means and a radio transmitter, said control means including a spindle which passes to the upper side of said carrier, a slotted arm attached to each control spindle, and pin means passing through the slots in the said arms for interconnecting the arms so that simultaneous variation of the characteristic of the signals can be effected by moving said pin over the map.

10. Apparatus for instructing students in the art of direction finding by radio, said apparatus including a plurality of simulation radio transmitting stations each of which comprises a transmitter unit by which electric wave signals can be distributed, a separate manually adjustable rotary control means for each transmitter unit to alter a characteristic of said signals to exhibit variations analogous to the phenomenon of variable signal amplitude observed during relative orientation of a radio direction finding means and a radio transmitter, an arm for actuating each of said rotary control means, said arms being arranged so as to intersect one another, said control means and actuating arms functioning to adjust the characteristic of the signals from each transmitter unit to correspond with those which would be observed if a radio direction finding equipment located at the point of intersection of the arms was employed to receive radio wave transmissions from stations situated at the positions occupied by the transmitter units.

11. Apparatus for instructing students in the art of direction finding by radio, said apparatus including a plurality of simulation radio transmitting station assemblies each of which comprises a metal casing, a coil assembly within said casing, means for applying electric wave signals to a primary part of said assembly, means for obtaining from a secondary part of said assembly electric wave signals which have been induced therein by the signals applied to the primary part, rotary control means for varying the coupling of said primary and secondary parts whereby a characteristic of the signals obtained from the secondary part can be made to exhibit variations analogous to the phenomenon of variable signal amplitude observed during relative orientation of a radio direction finding receiver means and a radio transmitter, and means whereby the angular adjustment of all of said rotary control means with respect to a common point can be determined.

12. Apparatus as recited in claim 9, wherein the slotted arm associated with each rotary control means is adjustably connected to the spindle of said control means to permit angular movement of the arm with respect to the spindle to enable compensation to be made for errors consequent upon the nature of the map projection.

PAUL ADORJAN.
RALPH PARTON GABRIEL.